April 29, 1969 R. O. TRAINA 3,441,810

MULTIPLE-MODE SOLID-STATE TIME DELAY APPARATUS INCLUDING CHARGE-MONITORING TIMING CIRCUITS

Filed Dec. 21, 1966 Sheet 1 of 9

INVENTOR

RICHARD O. TRAINA

BY Harry S. Shapiro

ATTORNEY

INVENTOR
RICHARD O. TRAINA

BY Harry G. Shapiro
ATTORNEY

INVENTOR
RICHARD O. TRAINA
BY Harry G. Shapiro
ATTORNEY

INVENTOR
RICHARD Q. TRAINA
BY Harry S. Shapiro
ATTORNEY

INVENTOR
RICHARD O. TRAINA
BY Harry G. Shapiro
ATTORNEY

INVENTOR
RICHARD O. TRAINA

BY Harry G. Shapiro
ATTORNEY

INVENTOR
RICHARD O. TRAINA
BY Harry G. Shapiro
ATTORNEY

INVENTOR
RICHARD O. TRAINA

BY Harry G. Shapiro
ATTORNEY

INVENTOR
RICHARD O. TRAINA
BY Harry G. Shapiro
ATTORNEY

United States Patent Office 3,441,810

Patented Apr. 29, 1969

3,441,810

MULTIPLE-MODE SOLID-STATE TIME DELAY APPARATUS INCLUDING CHARGE-MONITORING TIMING CIRCUITS

Richard O. Traina, Parsippany, N.J., assignor, by mesne assignments, to Plessey Airborne Corporation, Hillside, N.J., a corporation of New Jersey Continuation-in-part of application Ser. No. 427,035, Jan. 21, 1965. This application Dec. 21, 1966, Ser. No. 607,354

Int. Cl. H01h *47/18, 47/32*

U.S. Cl. 317—142 31 Claims

ABSTRACT OF THE DISCLOSURE

Multiple-mode solid-state time delay circuits in which the charge on a capacitor is monitored by a high-input-impedance temperature-stabilized amplifier or by a semiconductor switch, to actuate a relay. The relay may be locked electrically by establishing an amplifier operating bias or may be a mechanical latching type with set and reset coils. In one embodiment a unijunction transistor alternately monitors the charge stored upon a pair of condensers and triggers an SCR to supply alternate set and reset pulses. The relay controls its connection to the SCR, discharges the condensers, and provides output switching. A regulated power supply accommodates diverse power sources.

This application is a continuation-in-part of Ser. No. 427,035, filed Jan. 21, 1965, for Solid-State Time Delay Apparatus.

This invention relates to time delay apparatus, and more particularly to solid-state circuits for producing a response a predetermined interval of time after an event.

It has heretofore been proposed to employ a transistor to sense the charge on the capacitor of an R-C network and to actuate a relay a predetermined interval of time after commencement of the charging of the capacitor. While the broad principles of such circuits are known, it has not been possible to provide simple circuits with the required sensitivity, range, accuracy, speed, versatility, and stability. It is accordingly a principal object of the present invention to provide such circuits.

More specifically, it is a principal object of the invention to provide an improved timing circuit which is easily adapted to operation in any of a plurality of modes and which may be employed with power sources having widely different voltages and frequencies.

A further object of the invention is to provide such circuits which produce a certain response a predetermined interval of time after application or removal of power, or after closing or opening of a switch, or after application or removal of an electric signal.

Still another object of the invention is to provide a circuit of the foregoing type which cycles automatically to provide timed intervals, which may be fixed or adjustable.

Yet another object of the invention is to provide circuits of the foregoing type which "lock" automatically in predetermined condition.

A more specific object of the invention is to provide a simple and inexpensive delay on drop out (DODO) circuit.

An additional object of the invention is to provide improved circuits for charging and discharging a capacitor in accordance with predetermined schedules.

Briefly stated, in accordance with the invention a high-input-impedance transistor amplifier or switch senses the charge stored upon the capacitor of an R-C network and actuates a relay when the charge attains a predetermined level. Power is supplied from any one of a wide variety of sources by a network of series voltage-dropping resistors in conjunction with a rectifier, the output of which may be regulated and filtered. The circuit may be stabilized against the effects of ambient temperature changes by means of a forward-biased semi-conductor unit containing multiple rectifying junctions which establishes a voltage threshold for operation of the transistor amplifier. In accordance with one embodiment of the invention actuation of the relay causes the condenser to discharge through switch contacts of the relay and establishes a bias connection for the transistor amplifier (in effect a positive feedback) for maintaining the actuation of the relay until the circuit is reset. The time delay interval is determined by the time required to charge the capacitor to the predetermined level and may commence with the application of power to the circuit. In accordance with another embodiment of the invention a unijunction transistor alternately monitors the charge stored upon a pair of condensers and triggers a silicon controlled rectifier to supply alternate set and reset pulses to corresponding coils of a mechanical latching relay. The relay controls the connection of the coils to the SCR, controls the discharging of the condensers, and provides output switching.

The foregoing and other objects, advantages, and features of the invention, and the manner in which the same are accomplished will become more readily apparent upon consideration of the following detailed description of the invention taken in conjunction with the accompanying drawings, which illustrate preferred and exemplary embodiments, and wherein.

The components and values designated in certain figures of the drawings are representative. Corresponding parts have been designated by the same reference characters where appropriate.

Figures 1A, 1B:
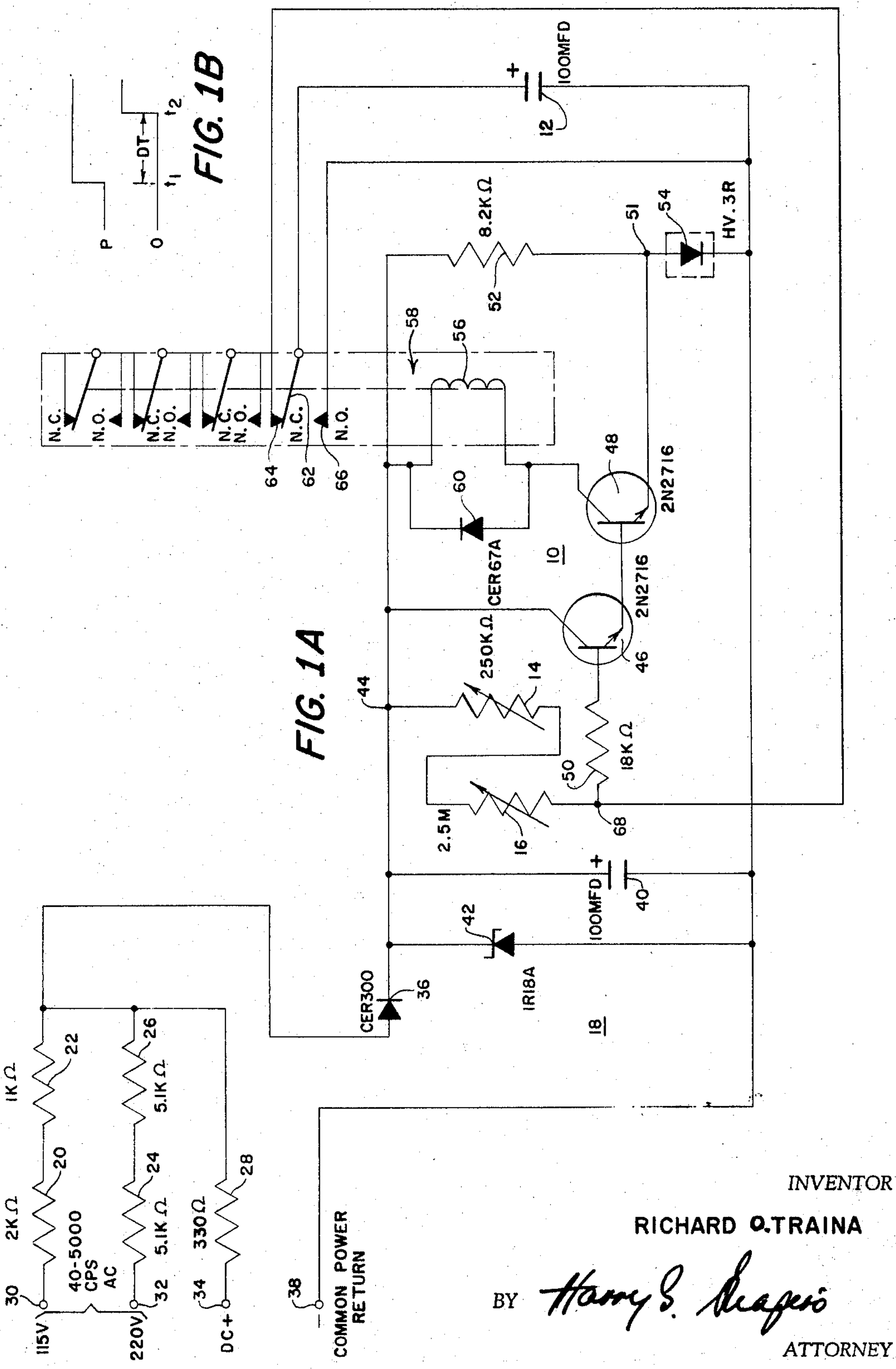
FIGURE 1A is a schematic diagram of a circuit in which a time delay interval commences with the application of power.
FIGURE 1B is a graphical diagram illustrating the action of the circuit of FIGURE 1A.

Referring to the drawings, and initially to FIGURE 1A, a basic timing circuit of the invention comprises a high-input-impedance transistor amplifier 10 for sensing the charge upon a timing capacitor 12, which is part of an R-C network including the capacitor and a pair of variable resistors 14 and 16 (which may provide coarse and vernier adjustment of the delay interval). Power is provided by a power supply circuit 18 including a network of series dropping resistors 20, 22, 24, 26 and 28. These resistors are arranged in branch circuits, one of which includes resistors 20 and 22 in series, a second of which includes resistors 24 and 26 in series, and a third of which includes resistor 28. One side of each branch circuit is connected to a corresponding power supply terminal 30, 32 or 34, and the other side of each branch circuit is connected to the anode of a half-wave rectifier, such as a semiconductor diode 36, which also serves to protect the unit if DC of the wrong polarity is supplied. Terminals 30 and 32 are adapted to be connected to sources of AC electric power at, for example, 115 volts and 220 volts, respectively. The frequency of the source may have any value within a wide range, such as 40 to 5000 cycles per second. Terminal 34 is adapted to be connected to a suitable source of DC which is positive with respect to a common power return terminal 38, which also serves as the second terminal for the AC supply. The output of rectifier 36 is filtered by a capacitor 40 and is regulated by a Zener diode 42.

The values of the series voltage dropping resistors are chosen so that regardless of which of the available sources of power is connected to the corresponding power input terminals, the same regulated DC potential will be provided at point 44 for charging capacitor 12 through resistors 14 and 16. The power supply circuit of the invention has the desired simplicity and versatility and avoids the use of expensive, frequency-limiting power transformers.

Amplifier 10 is a Darlington-type amplifier comprising a pair of NPN transistors 46 and 48, the emitter of transistor 46 being connected directly and only to the base of transistor 48. The amplifier has high input impedance so as to avoid loading the R-C circuit. The base of transistor 46 is connected through a resistor 50 to one side of resistor 16, and, as will be seen hereinafter, to the junction of capacitor 12 and resistor 16 during the charging of the capacitor. The emitter of transistor 48 is connected to the junction of a resistor 52 and the anode of a silicon Stabistor 54. The other side of resistor 52 is connected to point 44, while the cathode of Stabistor 54 is connected to terminal 38. The Stabistor comprises three semiconductor diodes in series with the same polarity and encapsulated in a single package. The Stabistor is provided with a substantially constant current controlled by resistor 52 and provides at point 51 a stable threshold voltage for operation of amplifier 10. As long as the voltage across the timing capacitor 12 is less than the forward voltage drop of the Stabistor no current can flow through resistor 50 into the base of transistor 46. When the timing capacitor voltage exceeds by 1 volt, for example, the forward drop of the Stabistor, base current starts to flow, and the emitter current of transistor 48 begins to increase. Stabistor 54 offers a low impedance to changing current, which, in effect, causes the emitter of transistor 48 to fall in voltage relative to the timing capacitor in order to drive transistor 48 into saturation.

The Stabistor provides compensation for ambient temperature changes. Because the three integral diodes are all at the same temperature and change their characteristic identically with temperature, a more tightly controlled temperature gradient is provided, giving better compensation, in comparison to three separate diodes, which cannot be at the same temperature because they are physically separated. The dynamic impedance of the Stabistor is greater than that of three separate diodes in series and ensures better snap action on long delays. The Stabistor thus makes the operation of the circuit substantially independent of transistor parameters and ambient temperature changes.

The collector of transistor 46 is connected to point 44. The collector of transistor 48 is connected to the same point through the operating coil 56 of a relay 58. Coil 56 is shunted by a diode 60 for damping transients and stabilizing the operation of the relay and controls a plurality of switches, including a single-pole, double-throw switch having a blade 62 normally closed upon a contact 64 and open with respect to a contact 66. These contacts constitute internal contacts for operation of the circuit. The remaining switches of relay 58 are available for external use in load circuits.

One side of capacitor 12 is connected to power supply terminal 38. The other side is normally connected through blade 62 and contact 64 to the junction point 68 of resistors 16 and 50. This establishes the charging circuit for the capacitor. The discharge circuit is established when blade 62 closes upon contact 66 and completes a shunt circuit across the capacitor. It will be noted that when blade 62 opens the circuit to contact 64, point 68 is no longer connected to the capacitor, and the base of transistor 46 is provided with a suitable bias from point 44 through resistors 14, 16 and 50.

FIGURE 1B illustrates the action of the circuit, curve P showing the application of power to the appropriate power input terminals at time $t_1$, and curve O showing the response at the output (relay contacts) at time $t_2$ after a time delay DT. Upon the application of power at $t_1$, capacitor 12 begins to charge, commencing the time delay interval. At a predetermined time $t_2$, governed by the setting of resistors 14 and 16, the voltage across capacitor 12 reaches a level at which amplifier 10 starts to conduct. Transistor 48 quickly reaches saturation, energizing coil 56 of relay 58 and transferring the relay contacts so as to close blade 62 upon contact 66, rather than upon contact 64. Capacitor 12 is thus isolated from the timing circuit and is discharged quickly, making the unit available for re-operation within a minimal time period. With contact 64 open, the base of transistor 46 assumes a positive bias potential from point 44 to maintain the transistors conductive and to maintain the relay energized. Thus positive feedback is established which electrically locks the relay. The circuit remains in this condition until the power is removed.

Figure 2A:
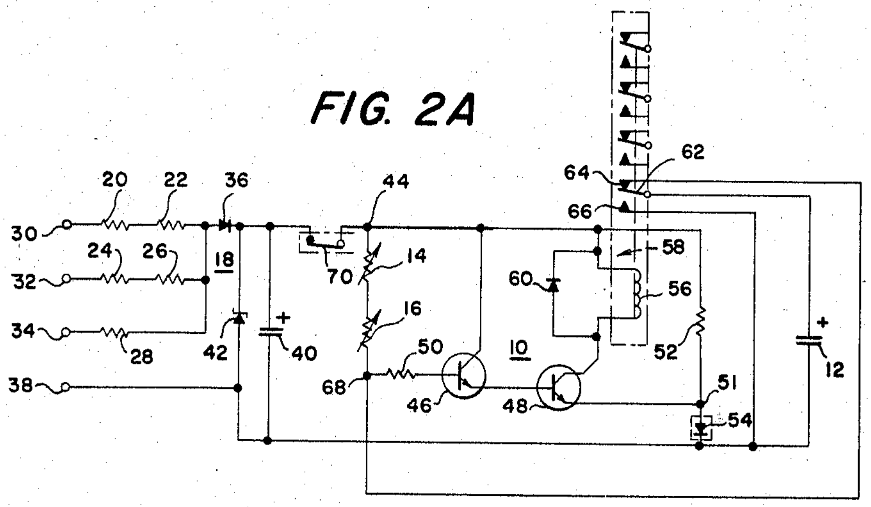
FIGURE 2A is a schematic diagram of a circuit in which a time delay interval is initiated by the opening and reclosing of a switch.
Figure 2B:
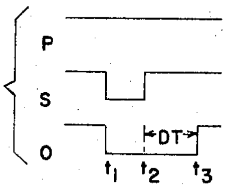
FIGURE 2B is a graphical diagram illustrating the action of the circuit of FIGURE 2A.

FIGURE 2A illustrates an embodiment identical to FIGURE 1A, except that the circuit operates in response to an external stimulus applied to a normally closed switch 70 connected between point 44 and the power supply. The input power is applied continuously during the total period of operation, as indicated by curve P in FIGURE 2B. Thus relay 58 will normally be energized and blade 62 will be closed upon contact 66 to maintain the capacitor 12 discharged. Momentary opening of the contacts of switch 70 commences the timing period. The opening of the switch is indicated by curve S at time $t_1$ and the reclosing at time $t_2$. At time $t_1$ the relay is deenergized as shown by the output curve O, because the bias or feedback is interrupted. The timing interval commences at time $t_2$ when switch 70 recloses to establish a charging circuit for capacitor 12 through contacts 62 and 64, which are closed when the relay is deenergized. At time $t_3$ the relay trips again, discharging the capacitor, re-establishing the bias, and ending the time interval. The circuit is thus automatically reset.

Figure 3A:
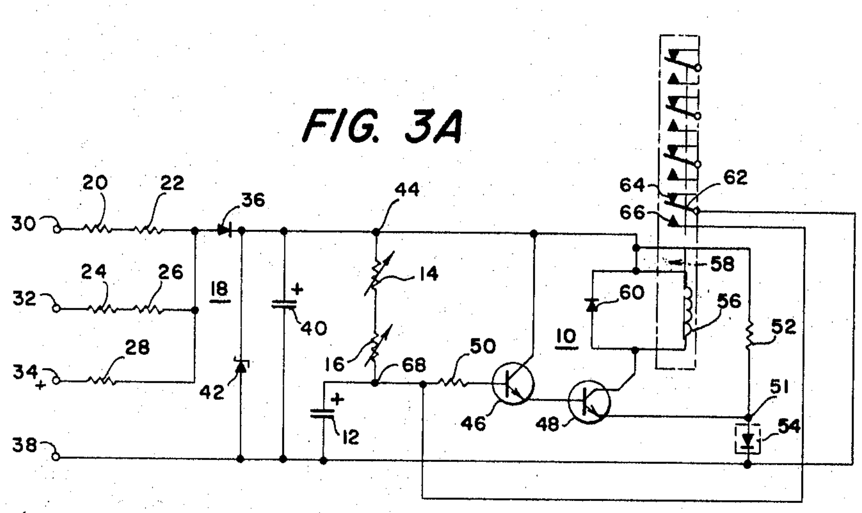
FIGURE 3A is a schematic diagram of an interval timer circuit.
Figure 3B:
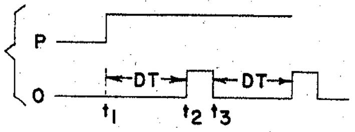
FIGURE 3B is a graphical diagram illustrating the action of the circuit of FIGURE 3A.

FIGURE 3A illustrates an embodiment in which the timing capacitor 12 is permanently connected between point 68 and terminal 38. In this case normally open contact 66 is connected to point 68 and the blade 62 is connected to terminal 38. Contact 64 is disconnected. This circuit provides an interval timer, the action of which is illustrated in FIGURE 3B. Upon application of power, as indicated by curve P at time $t_1$, capacitor 12 commences to charge and the circuit begins to time. At $t_2$, the completion of the preselected timing period DT, the output contacts transfer and remain transferred for the time required to discharge the capacitor, for example 150 milliseconds. The capacitor is substantially fully discharged before the relay returns to the condition illustrated and opens the discharge circuit, at time $t_3$, to permit the capacitor to charge again. The circuit will continue to generate pulses until the removal of input power.

Figures 4A, 4B, 5A, 5C:
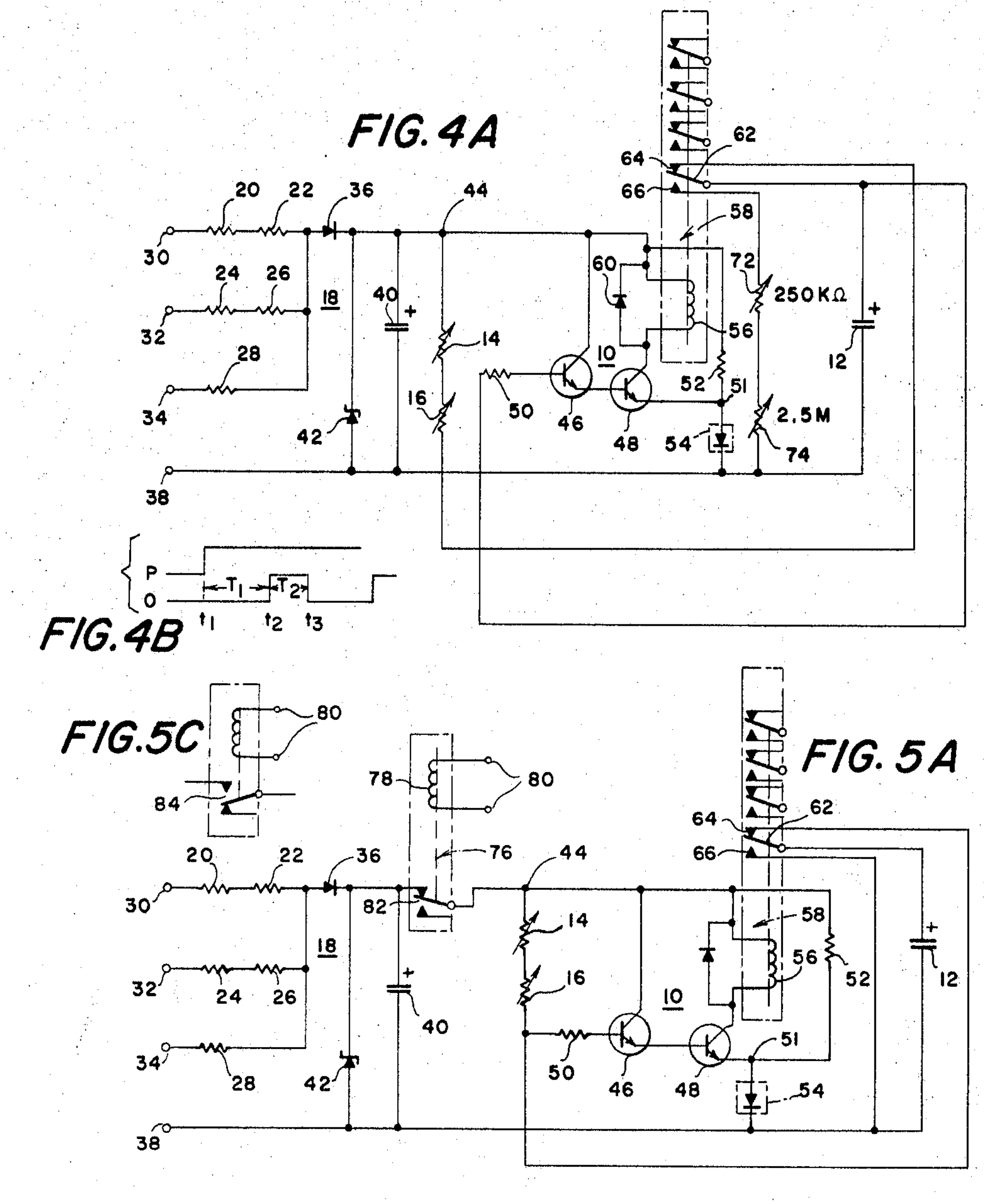
FIGURE 4A is a schematic diagram of a circuit similar to that of FIGURE 3A but in which the ON-OFF time may be independently adjusted.
FIGURE 4B is a graphical diagram illustrating the action of the circuit of FIGURE 4A.
FIGURE 5A is a schematic diagram of a circuit in which a time delay interval is initiated by the removal of an electric signal.
FIGURE 5C is a partial schematic diagram illustrating a modification in which the time delay interval is initiated by the application of an electric signal.

FIGURE 4A illustrates a modification similar to FIGURE 3A except that the length of the pulses corresponding to the discharge time of the capacitor 12 is adjustable to provide independently adjustable ON-OFF control. Capacitor 12 is again permanently connected between one side of resistor 50 and terminal 38 but in this case is disconnected from resistor 16 when blade 62 closes upon contact 66 and is discharged through variable resistors 72 and 74 in series upon closure of the switch blade upon contact 66. Upon application of the power, as shown in FIGURE 4B, timing period $T_1$ is initiated. At the completion of this period the relay contacts transfer and remain transferred for an adjustable period of time $T_2$, after which the contacts return to their normal position and the timing period $T_1$ is repeated. Both halves of the timing cycle are independently adjustable. The circuit will continue to generate pulses until removal of the input power.

Figures 5B, 5D:
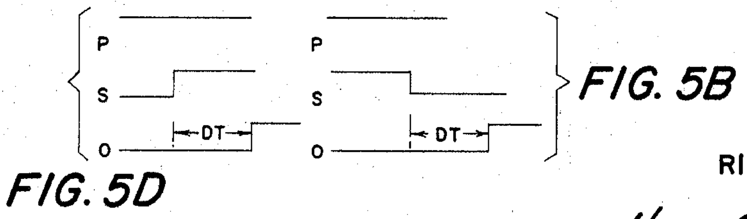
FIGURE 5B is a graphical diagram illustrating the action of the circuit of FIGURE 5A.
FIGURE 5D is a graphical diagram illustrating the action of the circuit of FIGURE 5C.

FIGURE 5A illustrates an embodiment responsive to an electric signal. This embodiment is identical to that of FIGURE 1A except for the addition of a signal relay 76 having a coil 78 connected to signal input terminals 80 and arranged to control a normally closed switch 82 between point 44 and the power supply. The input power is applied continuously for the total period of operation, as shown in FIGURE 5B by curve P. An external signal, which may be entirely isolated from the timing circuit, is applied to terminals 80, maintaining switch 82 open during the application of the signal. Relay 58 will be in the condition illustrated as long as the signal is applied. If now the signal is removed, as indicated by curve S, switch 82 will close, commencing the timing period DT. At the end of this period the contacts of relay 58 will transfer and will remain transferred until the signal is reapplied.

In the modification of FIGURE 5C normally open switch 84 replaces switch 82. Timing commences when the signal is applied to close the switch, as shown in FIGURE 5D. At the end of the timing interval DT the contacts of relay 58 transfer and remain transferred until the signal is removed to open switch 84.

Figures 6A, 6C:
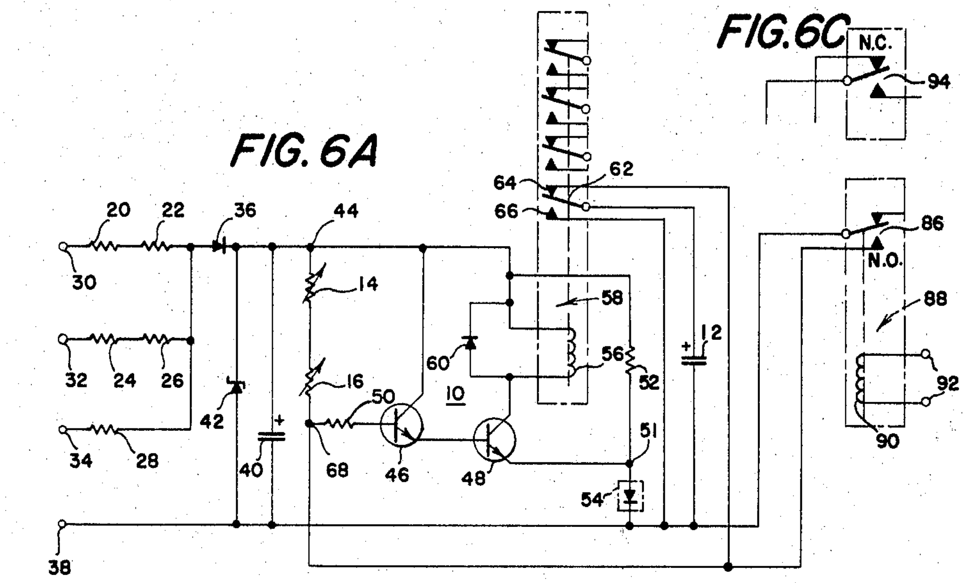
FIGURE 6A is a schematic diagram of a circuit in which a time delay interval is initiated by the momentary application of an electric signal.
FIGURE 6C is a partial schematic diagram of a modification in which the time delay interval is initiated by the momentary removal of an electric signal.

FIGURE 6A illustrates an embodiment similar to FIGURE 1A except that a normally open switch 86 of a relay 88 is connected between point 68 and terminal 38. Switch 86 is controlled by a relay coil 90 connected to signal input terminals 92. In the absence of a signal at terminals 92 switch 86 is open. The input power is continuously applied to the circuit throughout its operation, as shown by curve P in FIGURE 6B. Upon momentary application of the signal, timing commences. The signal is shown applied at time $t_1$ and removed at time $t_2$. The application of the signal causes switch 86 to close, connecting point 68 to point 38. This removes the amplifier bias, deenergizing relay 58 and returning its contacts to the condition shown. When the signal is removed, switch 86 opens and the capacitor commences to charge. At the end of the timing interval DT relay 58 is energized. Its contacts transfer from the position illustrated and remains there until the signal is again applied.

Figure 6D:
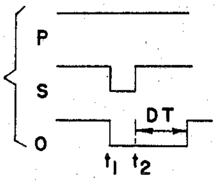
FIGURE 6D is a graphical diagram illustrating the action of the circuit of FIGURE 6C.
Figure 6B:
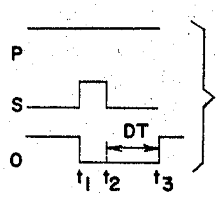
FIGURE 6B is a graphical diagram illustrating the action of the circuit of FIGURE 6A.

In the modification of FIGURE 6C normally closed switch 94 replaces switch 86. The signal present at terminals 92 maintains switch 94 open. At time $t_1$ the signal is removed, as shown in FIGURE 6D by curve S, permitting switch 94 to close and connect point 68 to terminal 38. This deenergizes relay 58, and the contacts thereof move to the position illustrated in FIGURE 6A. At time $t_2$ the signal is reapplied, opening switch 94 and permitting the capacitor to charge. At the end of interval DT the contacts of relay 58 transfer from the position illustrated in FIGURE 6A, discharging capacitor 12 and electrically locking the relay as previously described. This resets the circuit, which can be operated again only upon momentary removal of the electrical signal.

Figure 7A:
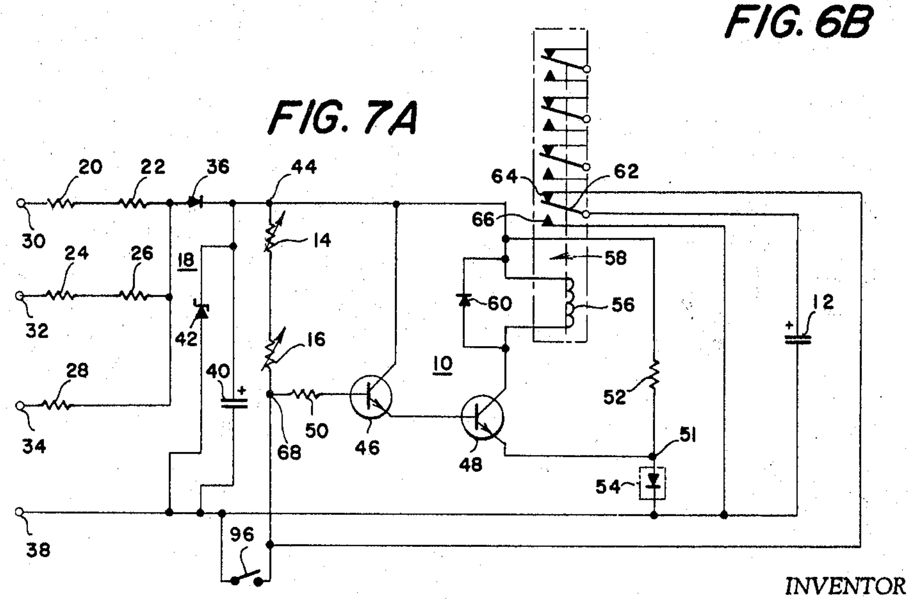
FIGURE 7A is a schematic diagram of a circuit in which a time delay interval is initiated by the momentary closing of a switch.
Figure 7B:
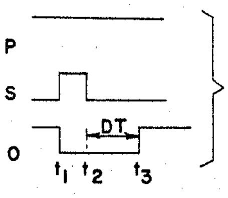
FIGURE 7B is a graphical diagram illustrating the action of the circuit of FIGURE 7A.

FIGURE 7A illustrates an embodiment similar to FIGURE 1A except that a normally open switch 96 is connected between point 68 and terminal 38. The input power is continuously applied to the circuit throughout its operation, as shown in FIGURE 7B. Upon momentary closure of switch 96, the timing period begins. At time $t_1$ the switch 96 is closed, as indicated by curve S in FIGURE 7B, which connects point 68 to terminal 38. This deenergizes relay 58, as shown by curve O. When the switch is opened at time $t_2$, the timing interval DT commences, and at time $t_3$ the contacts of relay 58 transfer from the position illustrated, discharging the capacitor 12. The relay remains electrically locked in this position, until switch 96 is momentarily closed again.

The foregoing multiple variations of the basic circuit are not only greatly advantageous to the ultimate user, but afford great economy from the manufacturing standpoint. At least seven timing circuits can be made from essentially the same basic circuit, thereby substantially reducing the cost of manufacturing a variety of timing circuits.

Figure 8A:
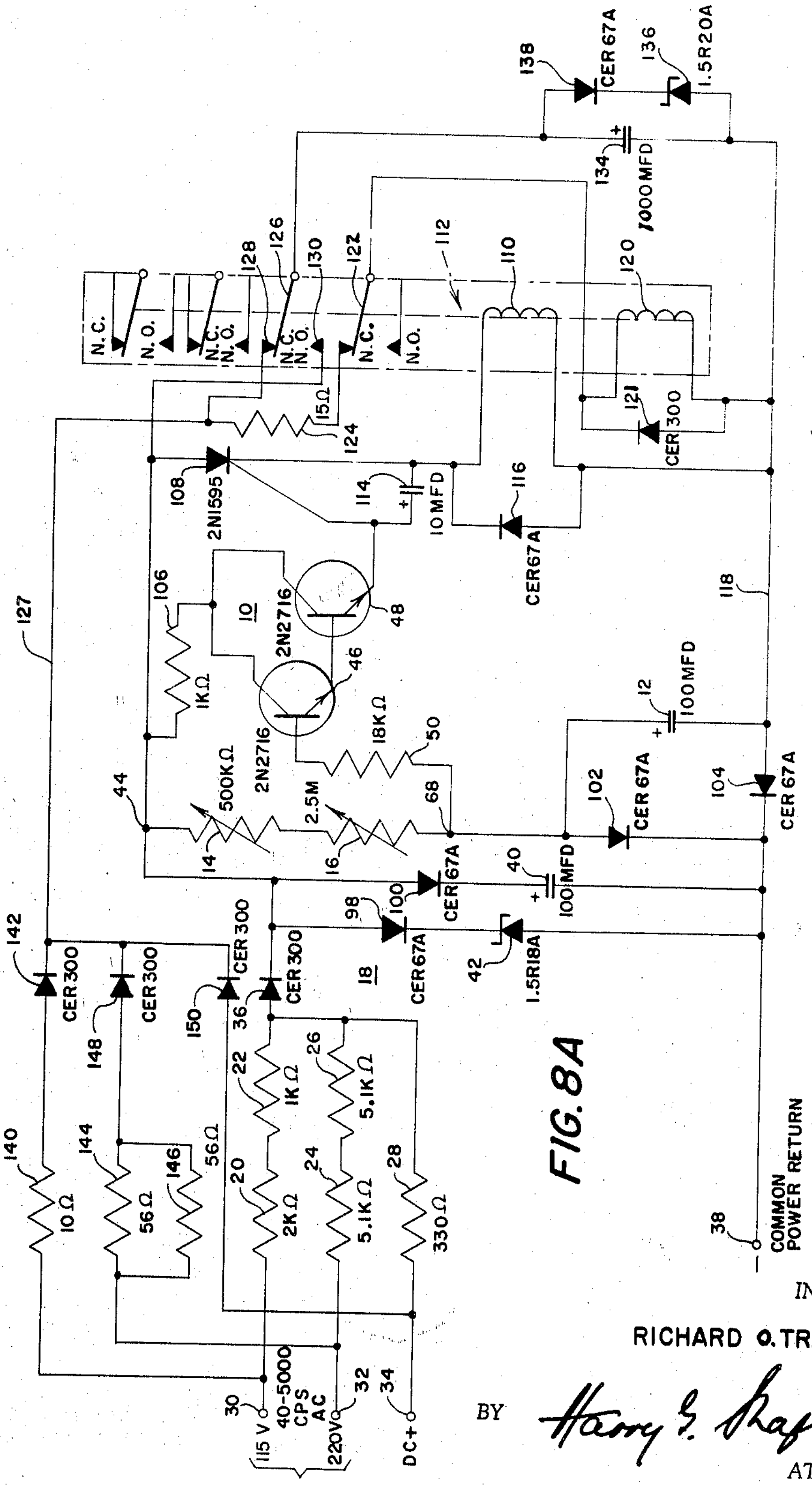
FIGURE 8A is a schematic diagram of a delay on drop out circuit, that is, a circuit in which the time delay interval is initiated by removal of power.

FIGURE 8A illustrates an ebodiment of the invention employing a timing circuit substantially similar to the timing circuit of FIGURE 1A but with modifications which will be described. The circuit of FIGURE 8A is a delay on drop out (DODO) circuit. Heretofore, true DODO time delays have been achieved by the sustaining of very sensitive relay contacts (low power drain) for a given time delay by the continual bleeding of a storage capacitor. The rate of discharge of the storage capacitor is controlled to provide variable timing. This form of DODO circuitry is expensive because of the extreme sensitivity required in the output relay. The circuit of FIGURE 8A provides true DODO delay inexpensively by the use of the aforesaid timing circuit in conjunction with a mechanical latching relay, charge storage capacitor, capacitor bias supply, and timing inhibitor.

The general arrangement of the power supply and timing circuit is as previously described and needs little further elucidation. In the power supply additional forward-biased rectifiers 98 and 100 are placed in series with the Zener diode 42 and the filter capacitor 40, respectively. Timing capacitor 12 is bridged by a pair of diodes 102 and 104 poled as shown with the cathodes connected to terminal 38. The collectors of transistors 46 and 48 are connected to point 44 through a resistor 106. The emitter of transistor 48 is connected to the gate electrode of a silicon controlled rectifier 108, the anode of which is connected to point 44 and the cathode of which is connected to one side of a coil 110 of an output relay 112. A capacitor 114 is connected between the gate electrode and the cathode of controlled rectifier 108, and a protective diode 116 is connected across coil 110 with the polarity shown. The other side of coil 110 is connected to conductor 118 and through rectifier 104 to terminal 38.

Relay 112 is a mechanical latching type. Coil 110 constitutes a reset coil. The relay also has a set coil 120 bridged by a protective diode 121. Set coil 120 is connected from conductor 118 through a normally closed switch 122 of the relay and a resistor 124 to a power supply conductor 127. Relay 112 also includes a single-pole, double-throw switch having a blade 126, a normally closed contact 128 connected to conductor 127, and a normally open contact 130 connected to point 14. The remaining switches illustrated, which are also operated by coils 110 and 120, are for external use in load circuits (not shown).

When blade 126 is closed upon contact 128 a charging circuit is completed from conductor 127 through a storage capacitor 134 to conductor 118. Capacitor 134 is bridged by a Zener diode 136 and a rectifier 138 in series with the polarity shown in order to protect the capacitor.

Conductor 127 is connected to terminals 30, 32 and 34 of the power supply by corresponding branch circuits including, in one branch, a voltage dropping resistor 140 in series with a rectifier 142, in a second branch, parallel resistors 144 and 146 in series with a rectifier 148, and in a third branch a rectifier 150. By virtue of this arrangement DC of the proper value is applied to conductor 127 regardless of which of the power supply terminals is energized.

Figure 8B:
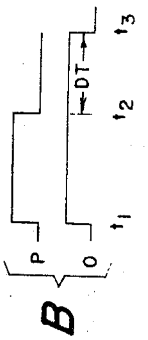
FIGURE 8B is a graphical diagram illustrating the action of the circuit of FIGURE 8A.

The action of the circuit of FIGURE 8A is illustrated in FIGURE 8B. Upon application of input power, indicated by curve P at time $t_1$, the charge storage capacitor 134 is rapidly charged from conductor 127 through contacts 126 and 128 to a peak value of, for example, 21 volts ±10% in a period of approximately two milliseconds. At the same instant that the charge storage capacitor is charged to set coil 120 of the relay is energized through switch 122, transferring the relay contacts immediately after the capacitor is charged, as shown by curve O. Switch 122 thus opens and contacts 126 and 130 close.

As long as the input power remains applied to the circuit the timing capacitor 12 cannot charge, because diodes 102 and 104 are in their conductive or forward-biased condition. This prevents the voltage across capacitor 12 from rising above approximately 0.7 volt, for example. The circuit will remain in this condition as long as the input power is applied.

Upon complete removal of the input power, at time $t_2$, diode 104 becomes reverse-biased by the voltage across capacitor 134, presenting a high impedance (of the order of $10^{10}$ ohms) in parallel with the timing capacitor 12. This permits the timing capacitor to charge from the storage capacitor 134 through the variable resistors 14 and 16, which control the length of delay. The voltage across capacitor 12 is sensed by amplifier 10 as previously described. In this case, however, the output of the amplifier is applied to the gate electrode of the silicon controlled rectifier 108, which is normally in its non-conductive state.

When the output of the timing circuit reaches the turn-on level of the silicon controlled rectifier, the SCR switches to its highly conductive state, presenting a very low impedance to the flow of current. This permits the charge remaining in the charge storage capacitor 134 to flow instantaneously through the reset coil 110 of the latching relay 112. The relay transfers its contacts back to the position illustrated, at time $t_3$, completing the delay period. At this time the charge storage capacitor 134 is completely discharged, resetting that portion of the circuit. The timing capacitor 12 is not discharged until reapplication of the input power forward-biases diode 104, permitting capacitor 12 to discharge through diodes 102 and 104.

FIGURES 9–16 disclose embodiments for performing substantially the same functions as embodiments described above but with somewhat different basic circuitry.

Figure 9A:
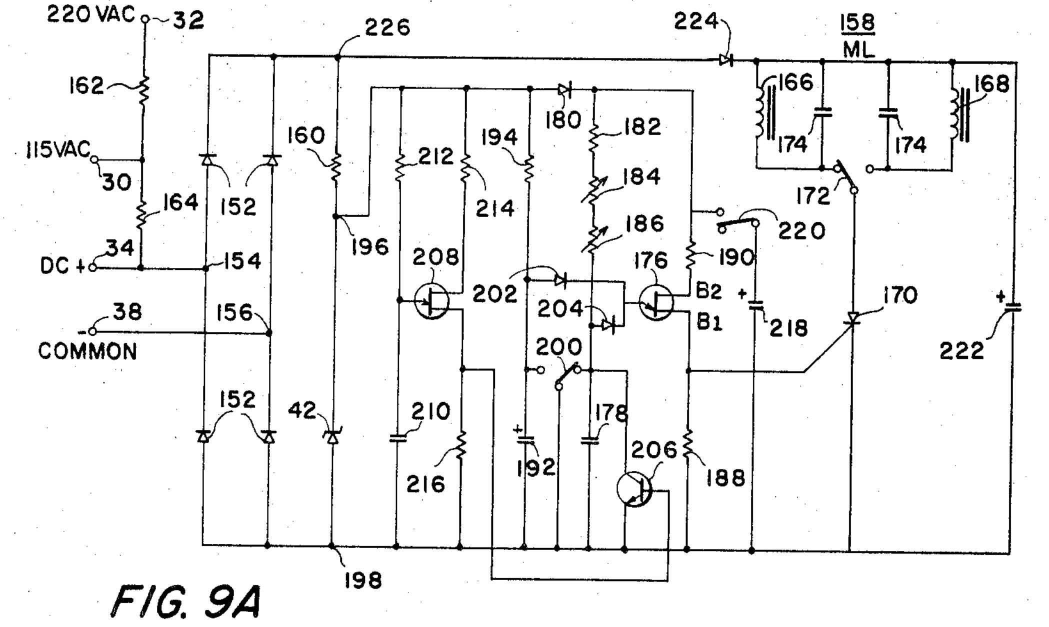
FIGURE 9A is a schematic diagram of another form of delay on drop out circuit.
Figure 9B:
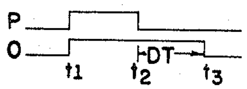
FIGURE 9B is a graphical diagram illustrating the action of the circuit of FIGURE 9A.

Referring to FIGURE 9A, for example, a full-wave rectifier is employed, comprising four diodes 152 forming a bridge. One of the input terminals, 154, of the rectifier bridge is connected to terminals 30, 32, and 34 of the power supply, for the application of different voltages, and the other input terminal, 156, is connected to common terminal 38. As will be seen more fully hereinafter, the full rectifier bridge output is applied to actuate a mechanical latching relay 158, while the timing circuit is supplied with a regulated voltage appearing across Zener diode regulator 42, which is supplied with operating current from the rectifier bridge by a series resistor 160.

Resistors 162 and 164 form voltage dropping impedances to reduce the applied input voltages to values which can be handled by the bridge and the Zener diode. If the input supply is connected to terminal 30, resistor 164 is the dropping impedance; however, if the input supply is connected to terminal 32, resistors 162 and 164 in series form the dropping impedance, and a higher operating voltage may be employed. By selection of the appropriate resistor values, almost any operating power source may be used. The rectifier bridge is insensitive to the polarity of the DC input supply. The simple power supply arrangement, with low-wattage voltage dropping resistors, is practical because, as will be seen more fully hereinafter, the relay coils are not continuously energized.

The mechanical latching relay 158, which is resistant to vibration, constitutes the output switch, and any number of output switch contacts (not shown) may be employed. The relay has two electrically independent actuating coils 166 and 168 and is mechanically latched in either of its two states, as indicates by the letters ML. Transfer from one state to the other requires that a pulse of electrical power be supplied to one of the coils. The coils need not be continuously energized to maintain contact position. Thus ambient temperature rise in any enclosure for the circuit, which would change timing periods, is not a problem. One of the coils may be considered a "set" coil and the other a "reset" coil.

Relay 158 is employed in a self-interrupting manner to permit one semiconductor switch, such as the SCR 170 to actuate each coil alternately. The relay includes a single pole double-throw switch 172 arranged to connect the coils 166 and 168 in series with the anode-cathode path of the SCR 170 alternately. When the SCR is rendered conductive, current flows through the relay coil selected by the switch 172. Capacitors 174 bridge the respective coils and ensure that sufficient energy is available to complete the transfer of the relay contacts when the circuit is broken at switch 172. When the SCR is rendered conductive, current flows not only through the selected coil but also into the corresponding capacitor, charging it toward the supply voltage. When the current through the coil reaches a sufficient value, the contacts begin to transfer, and the SCR turns off, but the energy stored in the capacitor discharges through the coil to supply the remaining energy required to complete the transfer of the contacts.

The timing circuit employs a unijunction transistor 176 for supplying the gate pulses to SCR 170. The unijunction transistor is capable of monitoring, with very high input impedance, any voltage connected between its emitter and base 1 terminals. When the voltage between the emitter and the base 1 reaches a specific fraction of the total voltage applied between base 2 and base 1, the unijunction "fires," producing a gating pulse for the SCR. For this to occur, the voltage between the emitter and base 1 must reach the peak point voltage of the unijunction.

A timing capacitor 178 charges from the power supply through a charging circuit including a rectifier 180 and series resistors 182, 184, and 186, the last two resistors being adjustable to provide coarse and fine adjustment of charging time. As long as the voltage on the capacitor is less than the peak point voltage, the unijunction emitter is reverse-biased. When the voltage on the capacitor reaches the peak point, the unijunction fires and delivers a pulse of current through resistor 188 connected in series with base 1, a biasing resistor 190 also being provided in series with base 2 and chosen for temperature compensation.

The unijunction 176 monitors the potential upon a pair of charge storage devices, namely, the timing capacitor 178 and another capacitor, 192, which is connected in series with a resistor 194 across the regulated supply terminals 196 and 198. Relay 158 has another single pole double-throw switch, 200, arranged to shunt capacitors 178 and 192 alternately. This ensures that each capacitor is returned to a completely uncharged state after each cycle, so that the capacitor starts from the same point when timing begins. The result is that the time required to reach the peak point voltage of the unijunction 176 and to turn on the SCR can be accurately established.

The single unijunction transistor 176 transmits both timing (set) and reset pulses to the SCR, and the two time periods are independent of each other in order to maintain accuracy. To achieve this separation of functions, a diode "OR" gate is employed. The gate comprises diodes 202 and 204, each having its anode connected to the positive plate of the corresponding capacitor 192 and 178 and having its cathode connected to the emitter of the unijunction 176. When one of the capacitors 178, 192 is short circuited by the switch 200, the corresponding diode of the OR gate has its anode connected to the negative side of the power supply, reverse-biasing the diode and providing a very high impedance which prevents the flow of information through that branch of the OR gate. This ensures that only one of the capacitors at a time is monitored by the unijunction 176.

Timing capacitor 178 is bridged by a transistor switch 206, which is saturated repetitively (for example, at the rate of 10,000 Hz.) by an oscillator comprising another unijunction transistor 208. The oscillator is a relaxation type including timing capacitor 210 and resistor 212 connected in series across the regulated terminals of the power supply, the junction of these elements being connected to the emitter of the unijunction transistor 208. The respective bases of this transistor are connected to the power supply terminals by resistors 214 and 216. Base 1 is connected to the base of transistor 206.

Another charge storage device, such as a nickel-cadmium cell 218 is utilized in the circuit. This cell is connected in series with switch 220 forming part of the relay 158 and is connected from terminal 198 of the power supply to the cathode of diode 180 when switch 220 is closed. A further charge storage device, capacitor 222, is connected from terminal 198 to one side of relay coils 166, 168 and to the cathode of a diode 224, the anode of which is connected to terminal 226 of the power supply.

In the operation of the circuit of FIGURE 9A, when power is applied (that is, when the power supply is energized) capacitor 222 is charged through diode 224. Capacitor 192 charges through resistor 194 toward the peak point of unijunction 176. When the unijunction fires, the pulse developed across resistor 188 triggers SCR 170, which transfers the relay contacts. This shorts capacitor 192, preventing it from charging again. The timing capacitor 178 is now ready to charge through the timing resistors, but it cannot do so, because it is shorted repetitively by the action of oscillator-controlled switch 206. The nickel-cadmium cell 218 is now being charged through diode 180. The circuit remains in this condition until power is removed.

When power is removed, cell 218 tries to provide current in a counter-clockwise direction, reverse-biasing diode 180. The oscillator comprising unijunction 208 ceases to function, which allows the timing capacitor 178 to charge and the timing period to begin.

When the voltage on the timing capacitor 178 reaches the unijunction peak point voltage, the unijunction 176 fires, and the energy in cell 218 turns on the SCR 170. The energy previously stored in capacitor 222 (while power was applied) discharges through relay coil 168 (diode 224 being reverse-biased) and returns the relay to its original position, completing the cycle. The operation is shown graphically in FIGURE 9B. The time required for the output contacts to transfer when power is applied initially is very small compared with the time delay, and hence the transfer at time $t_1$ is shown concurrent with the application of power.

Figure 10A:
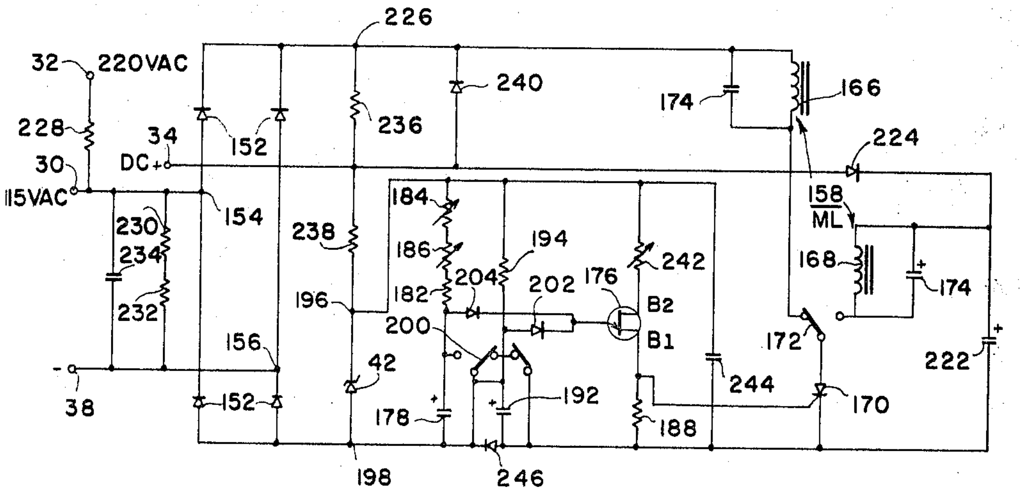
FIGURE 10A is a schematic diagram of another form of circuit in which a time delay interval is initiated by the application of power.

FIGURE 10A illustrates an embodiment of the invention for producing a time delay upon the application of power. The power supply circuitry differs slightly from that of FIGURE 9A, a resistor 228 being connected between terminals 30 and 32 and a pair of resistors 230 and 232 being connected in series between terminals 30 and 38 and across a filter capacitor 234. The positive DC terminal 34 is connected to the junction of a pair of resistors 236 and 238, which are connected in series with the Zener regulator 42 across the power supply terminals 226 and 198. A diode 240 connects positive DC terminal 34 to terminal 226, which in turn is connected to relay coil 166. Relay coil 168 is connected through rectifier 224 to positive DC terminal 34.

Variable resistor 242 is connected between base 2 of unijunction transistor 176 and power supply terminal 196. Capacitor 244 is connected between terminals 196 and 198 through a charging rectifier 246. Rectifier 246 is connected across capacitor 192 and is arranged to be short circuited by switch 200 at the same time that the switch shunts the capacitor.

In the operation of the circuit of FIGURE 10A, when power is applied, the timing capacitor 178 charges through resistors 182–186 toward the unijunction peak point. At the end of the delay period DT (FIGURE 10B) the unijunction 176 fires, transferring the relay contacts. Switch 200 now short circuits the timing capacitor 178, and switch 172 now connects coil 168 to the SCR 170.

Capacitor 192 cannot charge as long as the power is on, its upper plate being connected to the negative side of the power supply and diode 246 being forward-biased so as to limit the potential upon capacitor 192 to approximately 0.80 volt, for example.

Upon removal of the power, capacitor 244, which was charged when the power was on, tries to discharge in a counter-clockwise direction. Diode 246 is reverse-biased, permitting capacitor 192 to charge to the unijunction peak point. The unijunction fires and the energy in capacitor 244 is used to turn on the SCR 170.

Figure 10B:
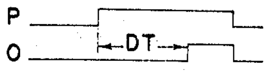
FIGURE 10B is a graphical diagram illustrating the action of the circuit of FIGURE 10A.

The energy stored in capacitor 222 while the power was on is now able to discharge through relay coil 168, diode 224 being reverse-biased. The contacts of the relay transfer to their original position, completing the cycle as shown in FIGURE 10B. The final transfer of relay contacts is shown concurrent with the removal of power, because the lag is insignificant compared with the delay DT.

Figure 11A:
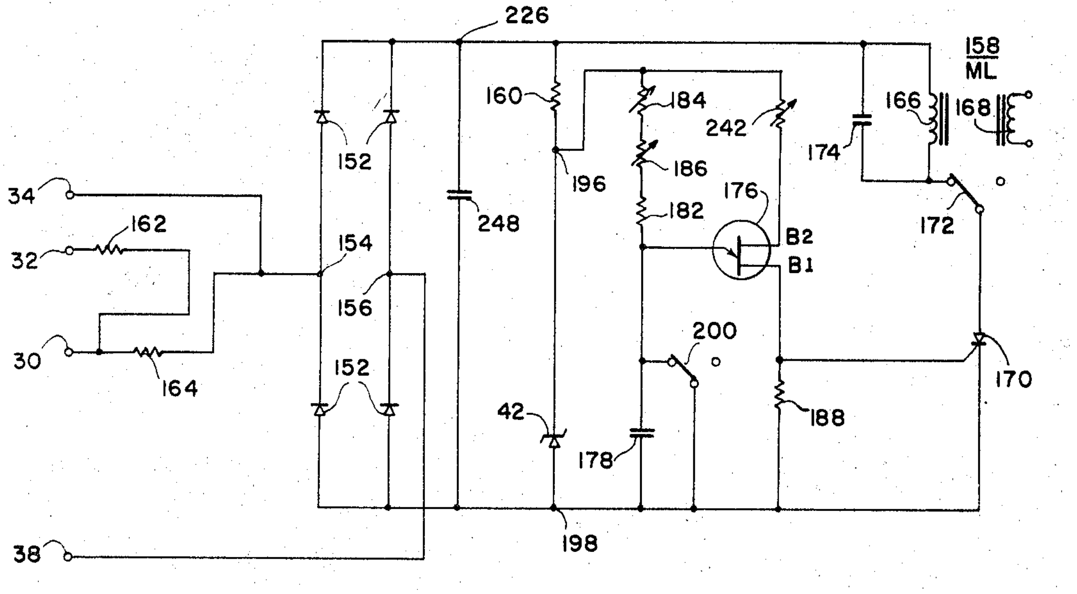
FIGURE 11A is a schematic diagram of another form of circuit in which a time delay interval is initiated by the momentary application of an electric signal.
Figure 11B:
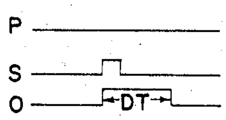
FIGURE 11B is a graphical diagram illustrating the action of the circuit of FIGURE 11A.

FIGURE 11A illustrates an embodiment of the invention in which a time delay is produced upon the application of a signal. Power is supplied continuously, a filter capacitor 248 being connected across terminals 226 and 198 of the power supply. While power is applied, the timing capacitor 178 cannot charge, because it is shorted by switch 200. When a signal voltage is applied to coil 168 of relay 158, the relay contacts transfer. This permits the timing capacitor 178 to charge through the timing resistance 182–186. When the peak point voltage is reached, the unijunction 176 fires, turning on SCR 170 to transfer the relay contacts to their original position and to reset the unit for the next signal. This operation is illustrated in FIGURE 11B.

Figure 12A:
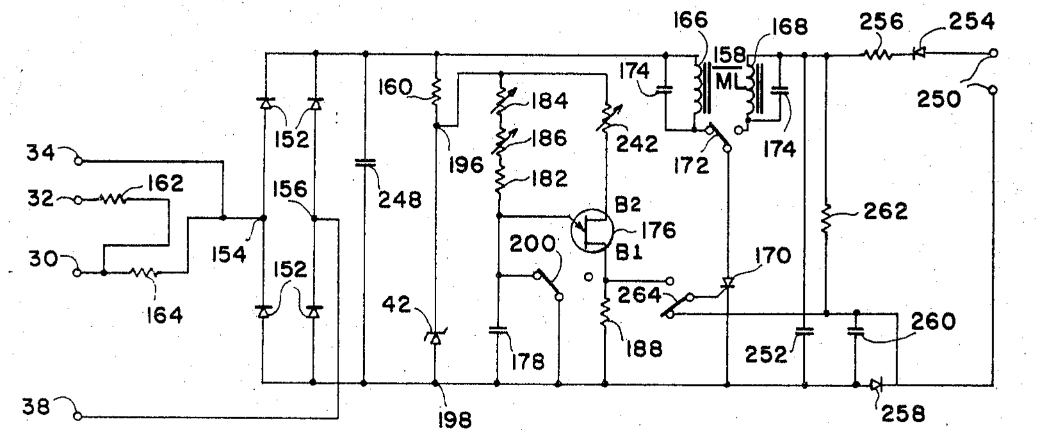
FIGURE 12A is a schematic diagram of another form of circuit in which a time delay interval is initiated by the momentary removal of an electric signal.

FIGURE 12A illustrates an embodiment of the invention in which a time delay is produced upon removal of a signal, operating power being continuously applied. The signal voltage is applied to terminals 250. Capacitor 252 is charged by the signal voltage through a charging circuit including rectifier 254, resistor 256, and rectifier 258. Another capacitor, 260, is connected in series with a resistor 262 across capacitor 252. Diode 258 is connected across capacitor 260. The junction of capacitor 260 and resistor 262 is arranged to be connected to the gate electrode of SCR 170 by a switch 264 which is part of the relay 158. Switch 264 has an alternate position for connecting the gate electrode of the SCR to base 1 of the unijunction 176.

In the operation of the embodiment of FIGURE 12A, as long as the signal is applied the circuit remains in the condition illustrated. Capacitor 252 is charged, but capacitor 260 is prevented from charging, because its upper plate is connected to the negative signal terminal and the diode 258 is forward-biased, shunting the capacitor.

Figure 12B:
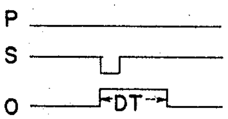
FIGURE 12B is a graphical diagram illustrating the action of the circuit of FIGURE 12A.

When the signal is removed, diode 258 becomes reverse-biased, allowing capacitor 260 to charge from the energy stored in capacitor 252, turning on SCR 170 and transferring the relay contacts. This permits the timing capacitor 178 to charge, creating the delay period. When the peak point of unijunction 176 is reached, the unijunction fires, turning on SCR 170 and actuating the other relay coil 168, to return the relay contacts, end the cycle, and reset the unit. This operation is illustrated in FIGURE 12B. Since the initial transfer of contacts occurs almost instantaneously upon removal of the signal, these events are shown concurrent.

Figure 13A:
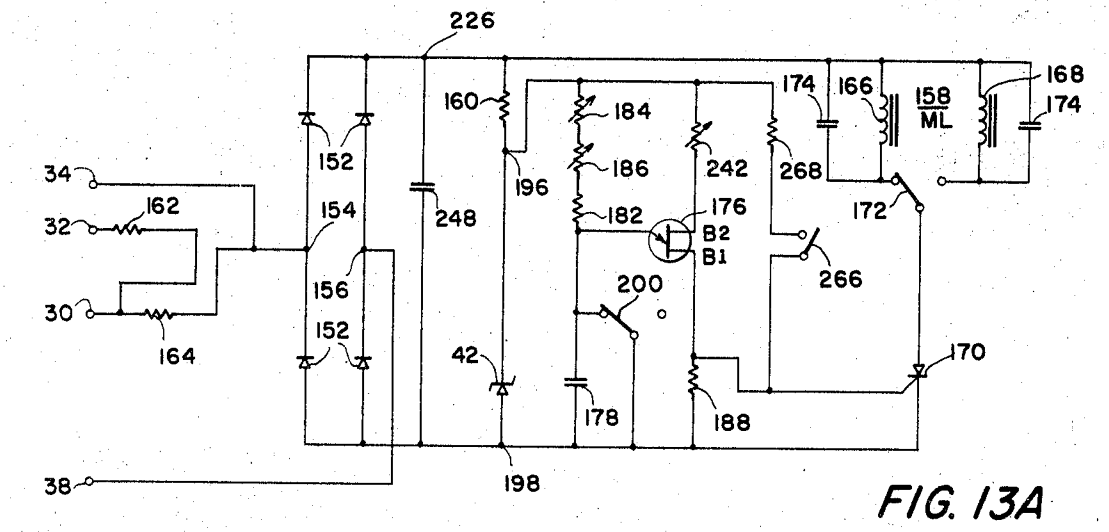
FIGURE 13A is a schematic diagram of another form of circuit in which a time delay interval is initiated by the momentary closing of a switch.

FIGURE 13A illustrates an embodiment of the invention wherein the delay period commences upon momentary closure of a switch 266 which connects the gate electrode of SCR 170 through a resistor 268 to terminal 196 of the power supply. Operating power is applied continuously.

Figure 13B:
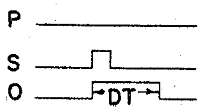
FIGURE 13B is a graphical diagram illustrating the action of the circuit of FIGURE 13A.

When the switch 266 is closed, the potential at the gate electrode of the SCR 170 is raised sufficiently to turn on the SCR. This actuates relay coil 166 and transfers the contacts of the relay. The timing capacitor 178 can now charge, creating the delay period. At the end of the delay, the unijunction 176 fires, turning on SCR 170. The relay contacts return to their original position, shorting timing capacitor 178 and resetting the unit. This action is illustrated in FIGURE 13B.

Figure 14A:
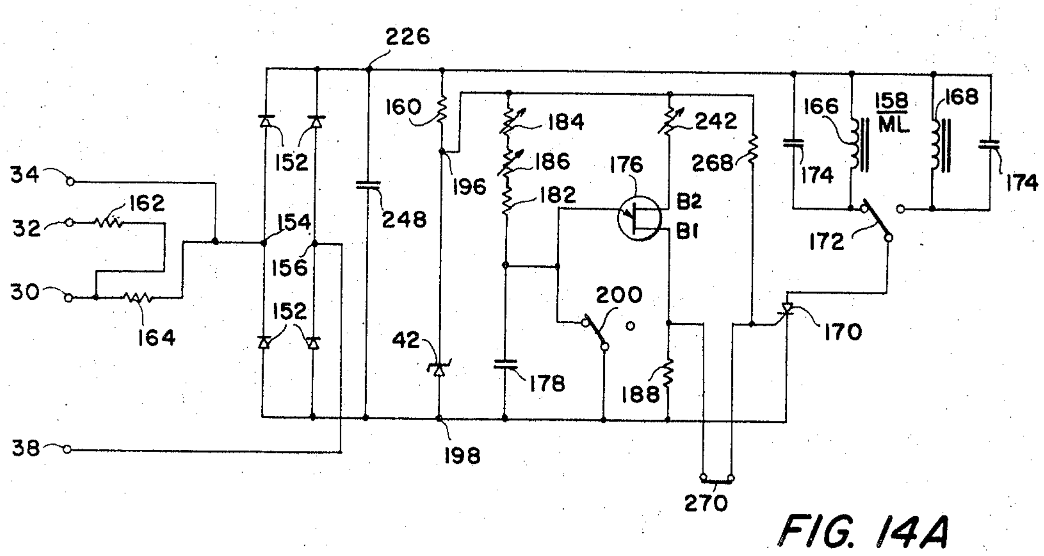
FIGURE 14A is a schematic diagram of another form of circuit in which a time delay interval is initiated by momentary opening of a switch.

FIGURE 14A illustrates an embodiment of the invention in which the delay period commences upon momentary opening of a switch 270 connected between the gate electrode of the SCR 170 and base 2 of unijunction 176. Operating power is applied continuously.

Figure 14B:
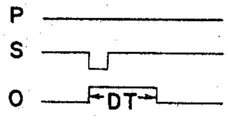
FIGURE 14B is a graphical diagram illustrating the action of the circuit of FIGURE 14A.

When the switch 270 is opened, the potential at the gate electrode of the SCR is raised sufficiently to turn on the SCR. This actuates relay 158 through coil 166 and transfers the contacts. Timing capacitor 178 now charges, creating the delay period. At the end of the delay the unijunction 176 fires, again turning on SCR 170. The relay now returns to its original position, shorting the timing capacitor and resetting the unit. This action is shown in FIGURE 14B.

Figure 15A:
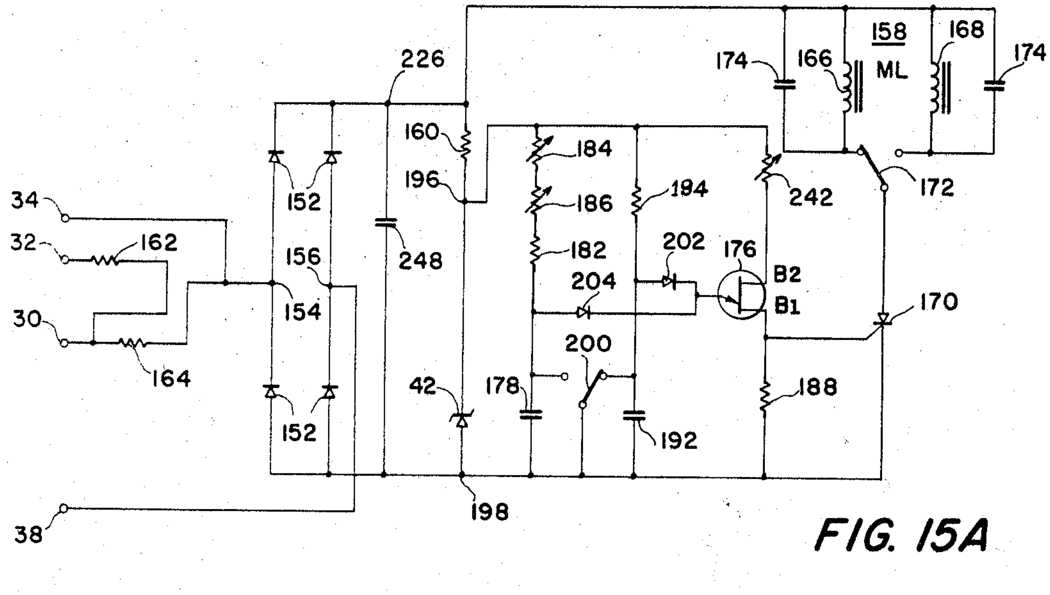
FIGURE 15A is a schematic diagram of another form of interval timer circuit.
Figure 15B:
FIGURE 15B is a graphical diagram illustrating the action of the circuit of FIGURE 15A.

FIGURE 15A illustrates an embodiment of the invention constituting an interval timer. When power is supplied, capacitor 178 begins to charge through timing resistors 182–186. At the end of the delay period, the unijunction 176 fires, turning on SCR 170. This transfers the relay contacts, which allows capacitor 192 to charge, and shorts capacitor 178, resetting the unit. Capacitor 192 charges and fires the unijunction in 200 milliseconds, for example, returning the contacts and starting the delay period again. The successive delay periods are designated in FIGURE 15B by the letter T.

Figure 16A:
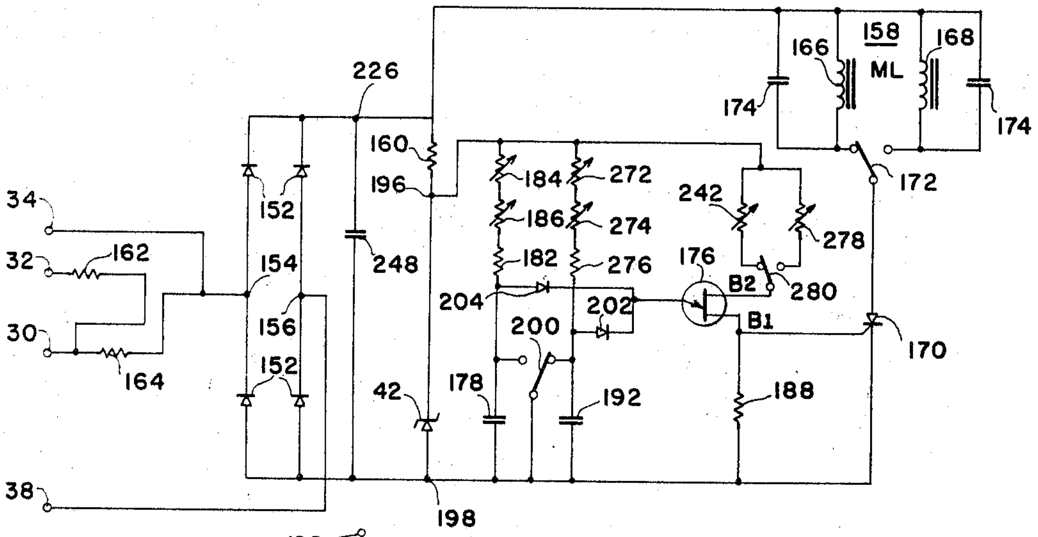
FIGURE 16A is a schematic diagram of another form of circuit for providing a repeat cycle timer in which the ON-OFF time may be independently adjusted.

FIGURE 16A illustrates an embodiment of the invention for providing a repeat cycle timer in which successive timing periods can be individually adjusted. Variable resistors 272 and 274 in series with fixed resistor 276 are provided in the charging circuit of capacitor 192. An additional variable resistor 278 is provided for the base 2 circuit of unijunction 176, either resistor 242 or 278 being selected by a single pole double-throw switch 280, which forms part of the relay 158.

Figure 16C:
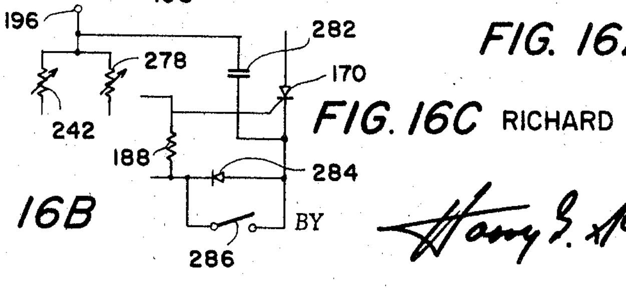
FIGURE 16C is a partial schematic diagram of a modification.
Figure 16B:
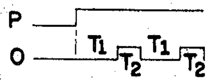
FIGURE 16B is a graphical diagram illustrating the action of the circuit of FIGURE 16A.

In the operation of the circuit of FIGURE 16A, when power is applied, capacitor 178 begins to charge through timing resistors 182–186, creating the delay period $T_1$. At the end of this delay period, the contacts transfer, shorting capacitor 178 and allowing capacitor 192 to charge, creating the delay period $T_2$. At the end of this delay period the unijunction fires again, triggering SCR 170 and returning the contacts to their original position. This shorts capacitor 192 and allows capacitor 178 to charge, repeating delay period $T_1$. The delay periods may be individually adjusted by virtue of the variable resistors in the respective timing circuits. The cycle continues as long as the power is on. This action is illustrated in FIGURE 16B.

The circuit of FIGURE 16A may leave the relay contacts in either position when the power is removed. It is sometimes desirable to ensure that the relay contacts will return to a predetermined position when power is removed, so that the circuit will always commence timing with delay period $T_1$ when the power is reapplied. This can be ensured by a slight circuit modification, as shown in FIGURE 16C, which illustrates only a portion of the circuit of FIGURE 16A and the following additional elements: capacitor 282 connected from the cathode of SCR 170 to the power supply terminal 196; diode 284 connected in the circuit from the cathode of the SCR and through resistor 188 to the gate electrode of the SCR; and switch 286 connected across the diode 284 and forming a part of the relay 158. In the operation of the circuit modified as shown in FIGURE 16C, if the power is removed during delay period $T_2$, switch 286 is open. Capacitor 282 (charged while the power was on) applies a potential to the cathode of SCR 170 (diode 284 being reverse-biased) and effectively raises the potential of the gate electrode to cause the SCR to fire. This returns the relay contacts to their original position. If power is removed during the delay period $T_1$, switch 286 will be closed, short circuiting diode 284 and preventing development of the potential at the cathode of SCR 170 to fire the SCR. Hence, the relay will remain in the proper position.

Typical components and values for the circuit of FIGURE 9A, for example, are as follows.

| Component: | Value or type |
|---|---|
| **176** | 2N2646 |
| **208** | 2N1671 |
| **206** | 2N3395 |
| **152** | CER–67A |
| **180** | GD–50 |
| **202** | GD–50 |
| **204** | GD–50 |
| **42** | 1R12A |
| **224** | CER–67A |
| **170** | C106A2 |
| **162** | 7.5K (2 w.) |
| **164** | 5.1K (2 w.) |
| **160** | 1.5K |
| **212** | 3.0K |
| **214** | 1.0K |
| **216** ohms | 51 |
| **194** | 4.3K |
| **190** ohms | 200 |
| **188** do | 51 |
| **210** microfarads | 0.047 |
| **192** do | 20 |
| **174** do | 20 |
| **222** do | 50 |
| **218** | 8.4V150B |

(values of 178, 182, 184, 186 depend on timing range)

While preferred embodiments of the invention have been shown and described, it will be apparent to those skilled in the art that changes can be made in these embodiments without departing from the principles and spirit of the invention, the scope of which is defined in the appended claims. Accordingly, the foregoing embodiments are to be considered illustrative, rather than restrictive of the invention, and those modificatons which come within the meaning and range of equivalents of the claims are to be included therein.

The invention claimed is:

1. A delay on drop out circuit comprising power supply means, a first charge storage device, a second charge storage device connected to said power supply means, means for charging said first charge storage device and for connecting said first charge storage device to said second charge storage device, means for preventing the charging of said second charge storage device while said power supply means is energized and responsive to de-energization of said power supply means for permitting said second charge storage device to charge from said first charge storage device, and means responsive to the attainment of a predetermined charge upon said second charge storage device for producing an output.

2. The circuit of claim 1, said means for producing said output comprising means for discharging said first charge storage device.

3. The circuit of claim 1, said means for preventing the charging of said second charge storage device comprising means for discharging it when said power supply means is energized.

4. The circuit of claim 1, said means for connecting said first charge storage device to said second charge storage device comprising a relay actuated in a first sense upon energization of said power supply means and actuated in a second sense in response to said output.

5. The circuit of claim 1, said means for preventing the charging of said second charge storage device comprising means which is conductive while said power supply means is energized and which becomes non-conductive upon de-energization of said power supply means.

6. The circuit of claim 1, said means for producing an output comprising an amplifier and a controlled rectifier, said amplifier having an input connected to said second device and having an output connected to the gate electrode of said controlled rectifier.

7. The circuit of claim 1, said means for preventing the charging of said second charge storage device comprising a normally non-conductive electric switch connected across said second charge storage device and oscillator means for rendering said switch conductive repetitively, said oscillator means being connected for energization from said power supply means.

8. The circuit of claim 1, said means for producing an output comprising a unijunction transistor and a semiconductor controlled rectifier, said transistor having an input connected to said second charge storage device and having an output connected to the gate electrode of said controlled rectifier.

9. The circuit of claim 1, said means for connecting said first charge storage device to said second charge storage device comprising a mechanical latching relay with a set coil responsive to energization of said power supply means and a reset coil responsive to de-energization of said power supply means.

10. The circuit of claim 9, further comprising a third charge storage device connected to said power supply means, said relay having a first switch for establishing a discharge path for said second and third charge storage devices alternately, said output-producing means being responsive to the charge upon said second and third charge storage devices alternately, the charging means for said first charge storage device including rectifier means for preventing discharge of said first charge storage device through said first switch, said means for connecting said first charge storage device to said second charge storage device comprising a second switch of said relay.

11. A charge monitoring circuit comprising a pair of charge storage devices, means for charging said devices, a relay having switch means for discharging said devices alternately, charge-responsive means for actuating said relay, and OR gate means connecting the input of said charge-responsive means to said devices.

12. The apparatus of claim 11, said charge-responsive means comprising a unijunction transistor, said means for charging said devices comprising a pair of charging impedances connected in series with said devices, said OR gate means comprising a pair of diodes connecting the emitter of said transistor to the junctions of said devices with their charging impedances, respectively.

13. Th apparatus of claim 11, said relay being a mechanical latching relay having set and reset coils, said means for actuating said relay comprising a controlled rectifier, said relay having additional switch means for alternately connecting said rectifier in series with said coils, respectively.

14. The apparatus of claim 11, said charge-responsive means comprising a unijunction transistor, said means for charging said devices comprising a pair of charging impedances connected in series with said devices, said OR gate means comprising a pair of diodes connecting the emitter of said transistor to the junctions of said devices with their charging impedances, respectively, said relay being a mechanical latching relay having set and reset coils, said means for actuating said relay comprising a controlled rectifier, said relay having additional switch means for alternately connecting said rectifier in series with said coils, respectively, and means connecting a base of said unijunction transistor to the gate electrode of said rectifier.

15. The apparatus of claim 11, further comprising a pair of capacitors connected across said coils, respectively.

16. Timing apparatus comprising a timing charge storage device, a mechanical latching relay having a set coil and a reset coil, a controlled rectifier, said relay having a first switch actuated between two positions by said coils, respectively, and connecting said rectifier to one of said coils in one of said positions, said relay having a second switch actuated between two positions by said coils, respectively, and establishing a discharge path for said charge storage device in one of its positions, and means for monitoring the charge upon said charge storage device and triggering said controlled rectifier.

17. The apparatus of claim 16, further comprising additional means for triggering said controlled rectifier while said discharge path is established.

18. The apparatus of claim 16, further comprising means for energizing the other of said coils when said first switch is in its said one position.

19. The apparatus of claim 16, said controlled rectifier having an anode, a cathode, and a gate electrode, said first switch, when in its said one position, connecting the anode-cathode path of said rectifier in series with said one coil and, when in its other position, connecting said anode-cathode path in series with the other coil.

20. The apparatus of claim 16, said coils being shunted by additional charge storage means.

21. The apparatus of claim 16, further comprising another charge storage device, said second switch establishing a discharge path for said other charge storage device in its other position, said monitoring means monitoring the charge on said devices alternately.

22. The apparatus of claim 21, further comprising electric switch means controlled by an oscillator for repetitively discharging one of said devices, said apparatus having power supply means, said oscillator being energized by said power supply means.

23. The apparatus of claim 21, further comprising power supply means for said apparatus, a third charge storage device connected in a discharge circuit with at least one of said relay coils and said controlled rectifier and connected to said power supply means by a charging circuit including a rectifier.

24. The apparatus of claim 23, the charging rectifier for said third charge storage device being connected across the second charge storage device and being shunted by the second switch concurrently with the establishment of the discharge path for said second charge storage device.

25. The apparatus of claim 16, said first switch being in said one position while said second switch is in said one position, the other coil being connected to a signal source for energizing it and transferring said switches to their other positions.

26. The apparatus of claim 16, said first switch being arranged to connect said coils to said controlled rectifier alternately, a second charge storage device, said relay having a third switch arranged to connect said second charge storage device and the output of said monitoring means to the gate electrode of said controlled rectifier alternately, and a third charge storage device connected to discharge through one of said coils and said controlled rectifier when said first switch is in its other position and having a charging circuit connected to a signal source.

27. The apparatus of claim 26, said second storage device having a charging circuit connected to said third storage device and having a shunt rectifier in the charging circuit of said third storage device poled to prevent the charging of said second storage device when the signal is present.

28. The apparatus of claim 16, further comprising signal-controlled means for triggering said controlled rectifier.

29. The apparatus of claim 16, further comprising another charge storage device, said second switch establishing a discharge path for said other charge storage device in its other position, said monitoring means monitoring the charge on said devices alternately, each of said charge storage devices having a separate adjustable charging impedance in series therewith.

30. The apparatus of claim 16, further comprising another charge storage device, said second switch establishing a discharge path for said other charge storage device in its other position, said monitoring means monitoring the charge on said devices alternately, rectifier means connected in circuit between the cathode and gate electrode of said controlled rectifier, said relay having an additional switch arranged to shunt said rectifier means when one of said coils is actuated but not the other, power supply means for said apparatus and a capacitor connected between said cathode and said power supply means for triggering said controlled rectifier if said rectifier means is not shunted by said switch when the power from said supply means is removed.

31. In a circuit of the type described, power supply means, charge storage means, means including a charging rectifier for establishing a charging circuit from said power supply means to said charge storage means, said rectifier means being reverse-biased upon removal of power from said power supply means, normally non-conductive electric switch means, means for connecting said switch means in a discharge circuit with said charge storage means, and time delay means for rendering said switch means conductive a predetermined delay interval after said removal of power to cause said charge storage means to discharge through said switch means at the end of said interval, said time delay means comprising second charge storage means, means for commencing the charging of said second charge storage means upon removal of said power, and means for rendering said switch means conductive when said second charge storage means charges to a predetermined level.

References Cited

UNITED STATES PATENTS

| | | | |
|---|---|---|---|
| 3,174,062 | 3/1965 | Laishley | 307—88.5 |
| 3,192,449 | 6/1965 | Brockett | 317—142 |
| 3,202,884 | 8/1965 | Bullock | 317—142 |
| 3,211,958 | 10/1965 | Miller et al. | 317—60 |
| 3,213,323 | 10/1965 | Circle | 317—33 |
| 3,215,856 | 11/1965 | Moser et al. | 307—88.5 |
| 3,290,517 | 12/1966 | Akmenkalns | 307—88.5 |
| 3,303,396 | 2/1967 | Culbertson | 317—142 |
| 3,321,641 | 5/1967 | Howell | 307—88.5 |
| 3,333,175 | 7/1967 | Klyce | 318—487 |
| 3,343,043 | 9/1967 | Kioshi Ito et al. | 317—124 |
| 3,239,722 | 3/1966 | Menkis | 317—142 |
| 3,246,209 | 4/1966 | Multari et al. | 317—142 |

LEE T. HIX, *Primary Examiner.*

U.S. Cl. X.R.

307—252, 253; 317—148.5, 155.5